United States Patent [19]
Watanabe

[11] Patent Number: 5,275,424
[45] Date of Patent: Jan. 4, 1994

[54] DISK HOLDING APPARATUS

[75] Inventor: Nobuyoshi Watanabe, Tokyo, Japan

[73] Assignee: Nihon Micro Coating Co., Ltd., Tokyo, Japan

[21] Appl. No.: 964,504

[22] Filed: Oct. 21, 1992

[30] Foreign Application Priority Data

Oct. 22, 1991 [JP] Japan ................ 3-94186[U]

[51] Int. Cl.⁵ .................................... G11B 25/04
[52] U.S. Cl. ........................ 279/2.03; 279/2.12; 279/43.4; 279/50
[58] Field of Search ............ 279/2.02, 2.03, 2.04, 279/2.12, 43, 43.2, 43.4, 50; 269/48.1

[56] References Cited

U.S. PATENT DOCUMENTS

| | | | |
|---|---|---|---|
| 2,435,480 | 2/1948 | Tuttle | 279/2.03 |
| 3,514,116 | 5/1970 | Brinkman | 279/2.02 |
| 4,705,279 | 11/1987 | Mizukami et al. | 279/2.02 |
| 4,755,981 | 7/1988 | Ekhoff | 279/2.03 X |
| 4,856,693 | 8/1989 | Kageyama et al. | 279/43 X |

FOREIGN PATENT DOCUMENTS 71961 4/1986 Japan.
219562 9/1986 Japan.

Primary Examiner—Timothy V. Eley
Attorney, Agent, or Firm—Heller, Ehrman, White & McAuliffe

[57] ABSTRACT

An apparatus for holding a disk with a central hole has a front rod which is received in a chuck so as to be able to move along its axis. The chuck is slidably received between the inner surface of a cylinder and the outer surface of the front rod. The front rod has on its front end an inverted truncated cone of which the maximum outer diameter is smaller than the diameter of the opening in the disk. When a part of the chuck is protruding from the cylinder, the disk can move past a bulge formed on the chuck and positioned on an expander. When the front rod is retracted into the cylinder, the inverted truncated cone moves inside the front end of the chuck so as to spread the chuck until it touches the inner surface of the opening of the disk, and the chuck is retracted along with the front rod so that the disk is firmly grasped and held between the front end of the cylinder and the bulge.

10 Claims, 5 Drawing Sheets

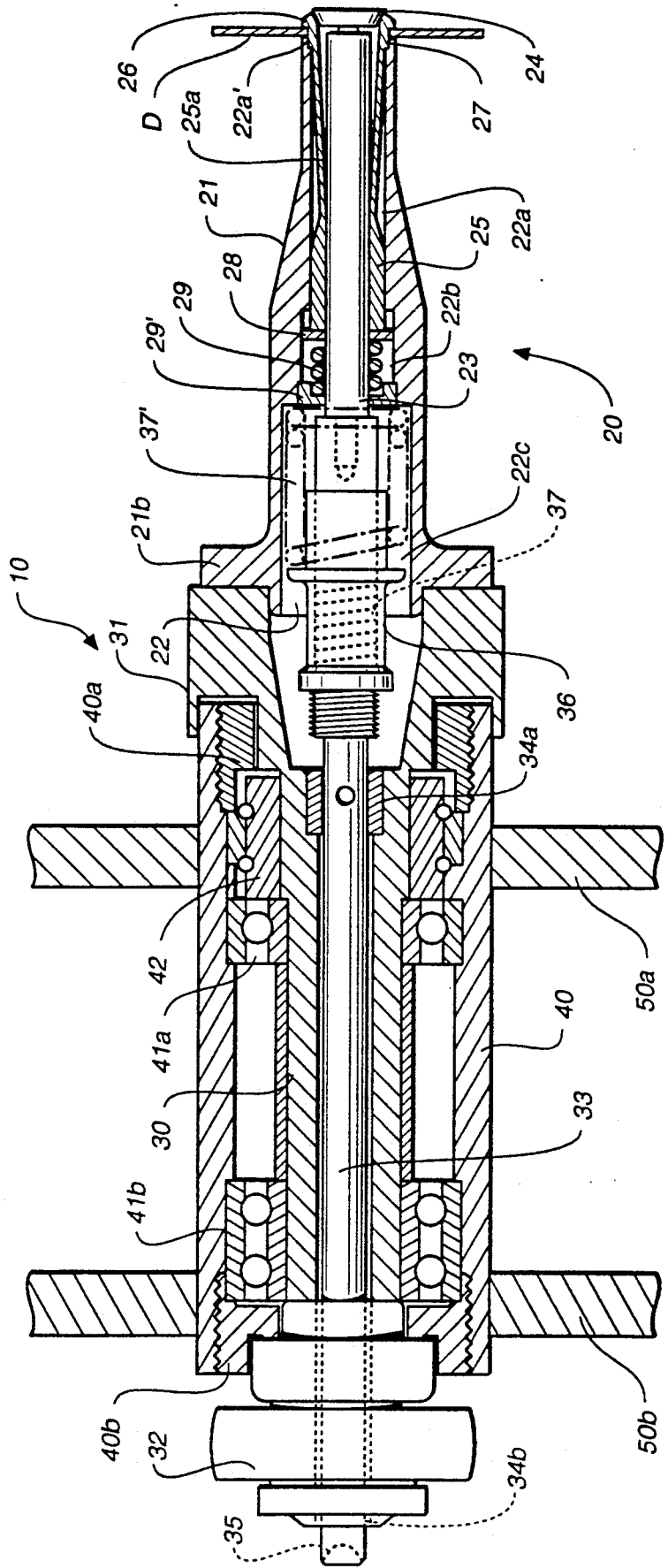
FIG._1

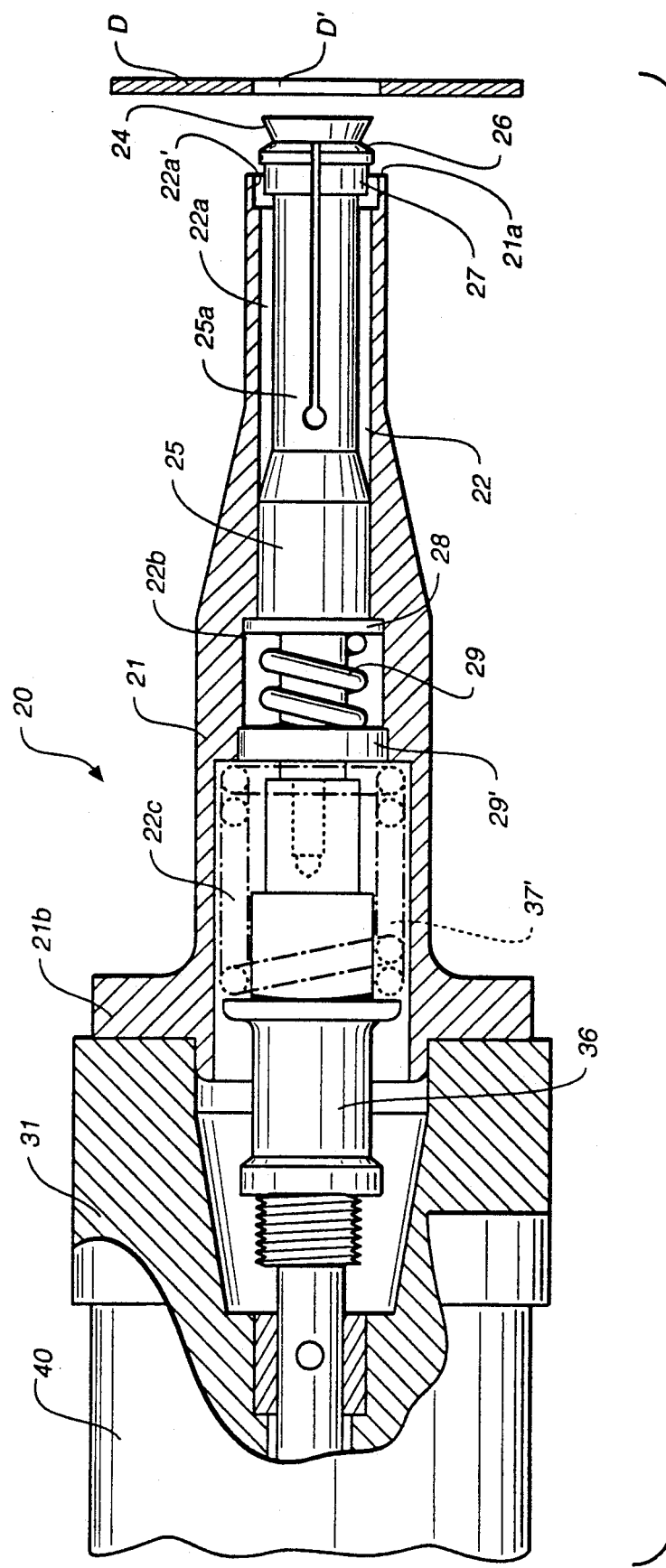
FIG._2

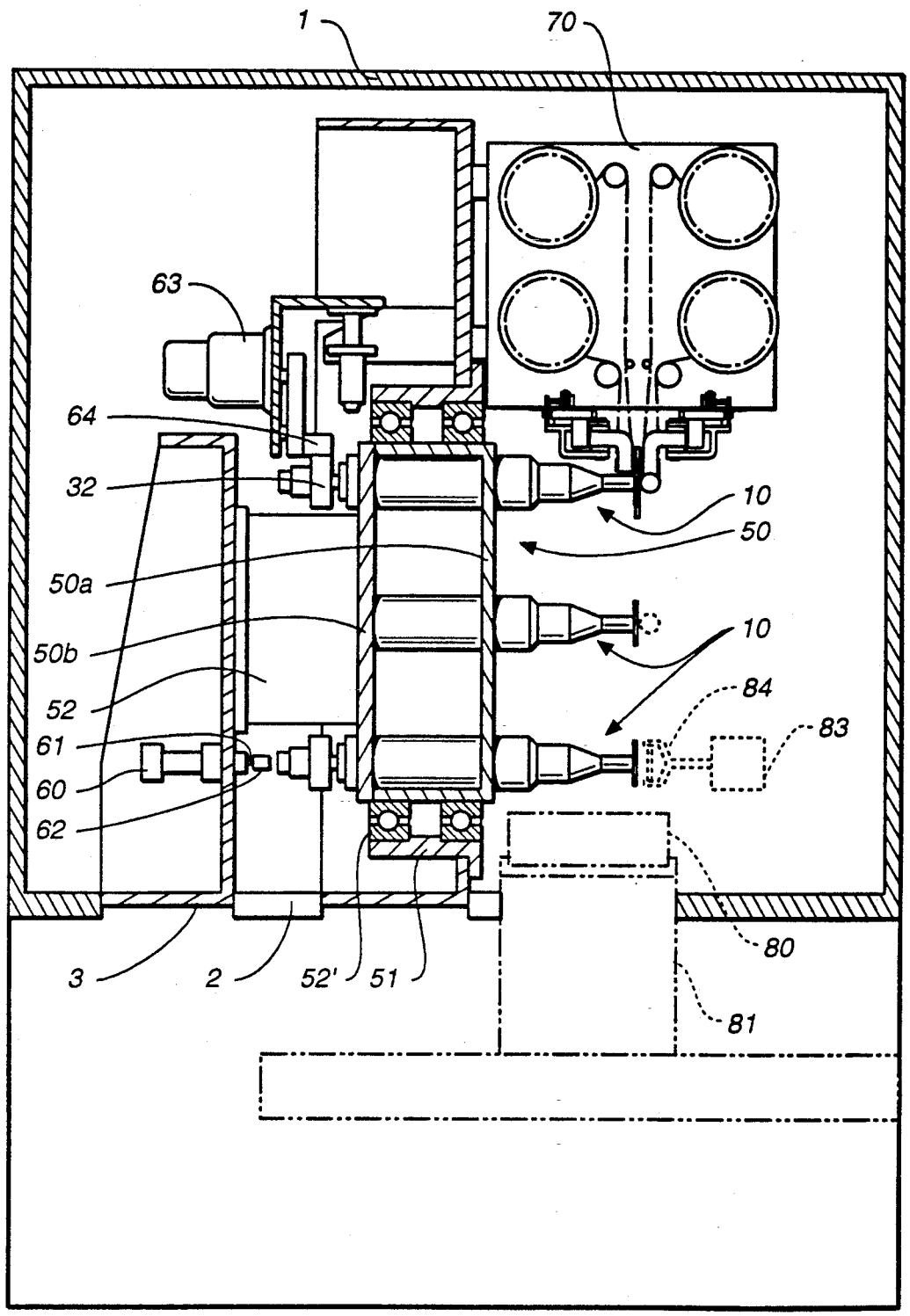
FIG._3

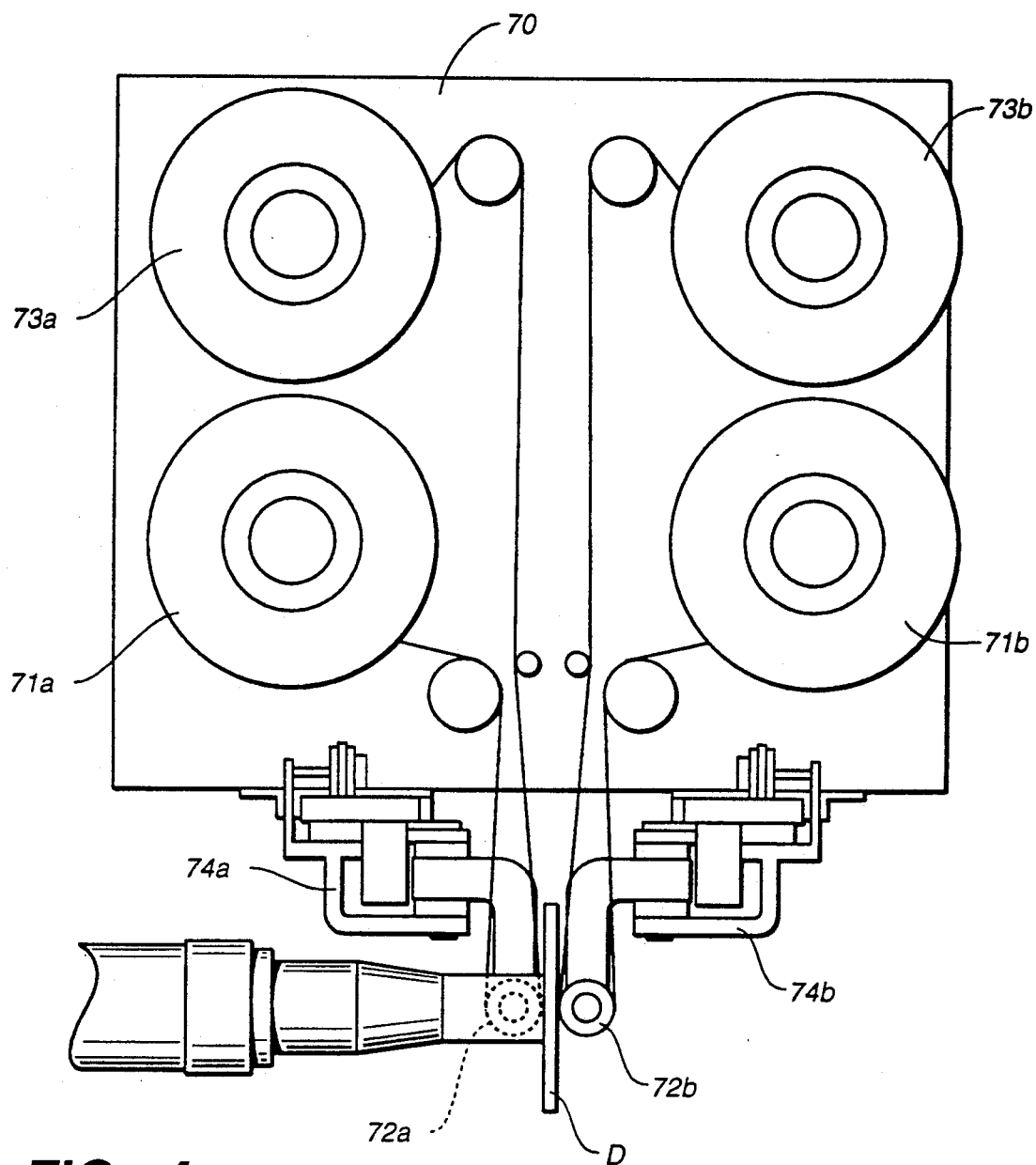
FIG._4

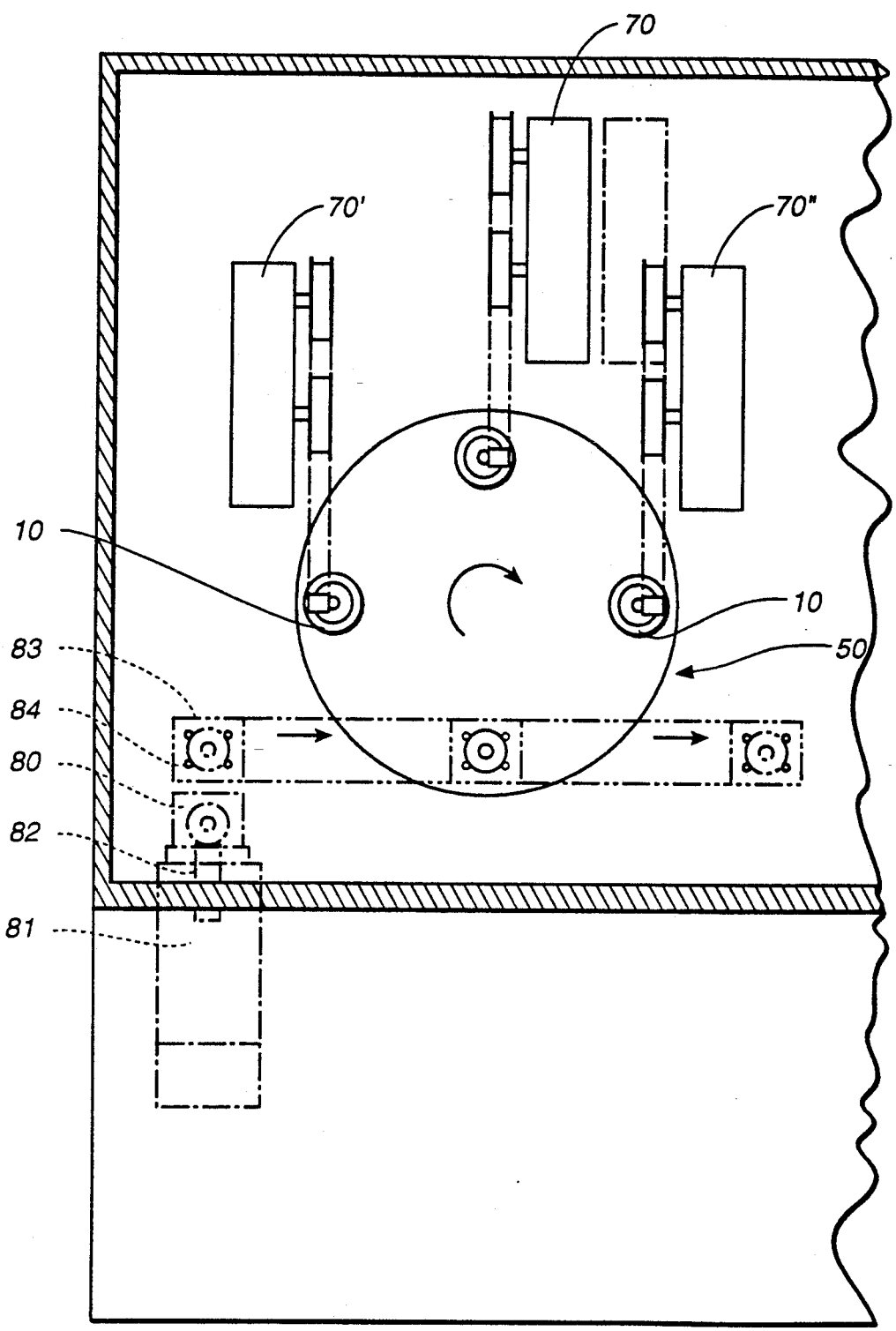
FIG._5 ific Patent Ko-kai (Laid-Open) Publication No. 61-71961.

DISK HOLDING APPARATUS

TECHNICAL FIELD

The present invention relates to an apparatus for grasping and rotating a disk such as a hard-disk used in a computer machine.

BACKGROUND ART

A prior art apparatus for grasping and rotating a disk for treating its both surfaces, has a pair of grasp means for grasping a central portion of the disk from both sides for indexing and rotating it. Such an apparatus is disclosed in Japanese Patent Ko-kai (Laid-Open) Publication No. 61-71961.

There is another kind of disk grasping and rotating apparatus which has a pair of grasp means for grasping a disk from both sides to index the disk. A rotatable chuck extends from one of the grasp means into a central opening of the disk, and a rod which is slidably received in the chuck spreads the chuck so as to support the disk from the inside. Next, the grasp means separate from the disk and the disk is rotated by rotating the chuck which grasps the disk. This apparatus is disclosed in Japanese Patent Ko-kai (Laid-Open) Publication No. 61-219562.

In order to simultaneously treat both sides of a disk by using treating tapes, the disk must be indexed at a center between a pair of rolls such that the treating tapes can be pushed on its surfaces.

The aforementioned disk grasping and rotating apparatus can accurately grasp and rotate a disk, but it needs pair of grasp means in order to position or index the disk.

The apparatus which support a disk from the inside and rotates it by means of a chuck means also must be able to position or index the disk by means of a pair of grasp means.

SUMMARY OF THE INVENTION

It is, therefore, an object of the present invention to provide a holding apparatus which can accurately position or index and grasp a disk by itself.

It is another object of the present invention to provide a disk rotating mechanism into which the holding apparatus is incorporated.

These and other objects are accomplished by providing an holding apparatus for grasping and holding a disk comprising:

a) a cylinder having a through-hole in the axial direction, the outside diameter of the front end of the cylinder being slightly greater than the diameter of a central opening of the disk, b) a front rod received in the cylinder so that it can move back and forth along the axis and that has on its front end an inverted truncated cone, the maximum outside diameter of the cone being smaller than the diameter of the central opening of the disk, and c) a chuck slidably received inside the through-hole of the cylinder between the inner surface of the through-hole and the outer surface of the front rod, the chuck having at its front end an expansible portion which is split into plural pieces in the axial direction so as to be able to spread in the radial direction and has a first bulge at the front end, a part of the expansible portion protruding from the cylinder by elastic means.

When the part of the expansible portion of the disk holding apparatus protrudes from the cylinder, the disk can move past the first bulge and be positioned on the expansible portion.

Following the first bulge of the chuck, a second bulge may be provided on the front rod. The diameter of the second bulge is smaller than the diameter of the first bulge such that the disk can be positioned on the second bulge. The elastic means preferably comprises a spring.

A disk holding and rotating mechanism of the invention comprises a disk holding apparatus and a rotating apparatus. The disk holding apparatus has:

a) a cylinder having a through-hole in the axial direction, the outside diameter of the front end of the cylinder being slightly greater than the diameter of a central opening of the disk, b) a first rod which is received in the cylinder so that it can move back and forth along the axis and has on its front end an inverted truncated cone, the maximum outside diameter of the cone being smaller than the diameter of the central opening of the disk, and c) a chuck slidably received within the through-hole of the cylinder between the inner surface of the through-hole and the outer surface of the first rod, the chuck having on its front end an expansible portion which is split into plural pieces in the axial direction so as to be able to spread in the radial direction and has a first bulge at the front end, a part of the expansible portion protruding from the cylinder by a first elastic means.

The rotating apparatus has:

d) a stationery hollow (or tubular) member;

e) a rotary cylinder received in the stationery hollow (or tubular) member so as to rotate with respect to the axis, the front end of the rotary cylinder being coupled to the rear end of the hollow (or tubular) member so that their axes agree each other, the rotary cylinder being rotated by rotation means, and f) a second rod received in the rotary cylinder so as to be able to move back and forth along the axis, the front end of the second rod being coupled to the rear end of the first rod.

When the first rod of the disk holding apparatus is retracted into the cylinder, the inverted truncated cone of the first rod comes inside the expansible portion of the chuck such that the expansible portion touches the inner surface of the central opening of the disk, and the chuck is retracted along with the first rod so that the disk is grasped and held between the end of the cylinder and the first bulge.

When the rear end of the second rod is pushed into the disk holding and rotating mechanism, a part of the expansible portion of the chuck and the first rod protrude from the cylinder. In this state, the disk can move past the first bulge and be positioned on the expansible portion, and the disk which is grasped and held between the end of the cylinder and the first bulge is rotated by rotation of the rotary cylinder.

BRIEF DESCRIPTION OF THE DRAWINGS

The present invention will now be described in detail in connection with the attached drawings in which:

FIG. 1 is a sectional view of a disk holding and rotating mechanism into which a holding apparatus of the invention is incorporated.

FIG. 2 is an enlarged fragmentary sectional view of a holding apparatus of the invention from which a chuck protrudes.

FIG. 3 is a disk treating apparatus which treats a disk by means of a disk holding and rotating apparatus into which a holding apparatus of the invention is incorporated.

FIG. 4 is a schematic illustration of a tape driving apparatus which is incorporated into the disk treating apparatus of FIG. 3.

FIG. 5 is a schematic plan view of the disk treating apparatus of FIG. 3.

PREFERRED EMBODIMENT FOR CARRYING OUT THE INVENTION

FIG. 1 shows a disk holding and rotating mechanism 10 of the present invention. Preferably a plurality of such disk holding and rotating mechanisms 10 are installed parallel to each other in a rotary drive cylinder 50 (see FIG. 3 and FIG. 5). The holding and rotating mechanism 10 consists basically of a holding apparatus 20 for holding the disk in place, a rotary cylinder 30 for rotating a disk, and a stationary hollow cylinder 40 which supports the rotary cylinder 30 rotatably therein.

The stationary cylinder 40 penetrates and is attached firmly to a round front plate 50a and round rear plate 50b that make up the rotary drive cylinder 50, and the front and rear of the stationary cylinder 40 are threaded inside so as to be able to screw-engage with bearing stoppers 40a and 40b.

Housed inside the holding cylinder 40 is a rotary cylinder 30 supported rotatably by bearings 41a and 41b and seal bearing 42. The diameter of a front part 31 of the rotary cylinder 30 is approximately the same as the outside diameter of the holding cylinder 40, and a part of it extends toward the rear so as to cover a part of the front end of the stationary cylinder 40. This is to prevent any powder particles produced by processing of the disk from getting in between the stationary cylinder 40 and the rotary cylinder 30. A seal bearing 42 is provided between the stationary cylinder 40 and the rotary cylinder 30 for the same purpose. A pulley 32 is fixed to a rear part of the rotary cylinder 30. The pulley 32 is coupled to a motor such that it can be rotated by the motor with respect to the stationary cylinder 40 (see FIG. 3).

A rod 33 is received inside the rotary cylinder 30 so as to be able to move back and forth in the axial direction via seals 34a and 34b. These seals 34a and 34b, besides supporting the rod 33 so that it can move back and forth inside the rotary cylinder 30, also serve the purpose of forming a seal so as to prevent any powder particles produced in disk processing from getting inside. At the rear end of the rod 33 is concavity 35 that mates a protrusion 62 on the end of the push-pressure rod 61 of a pneumatic rod push-pressure apparatus 60 shown in FIG. 3. When driven by the pneumatic push-pressure apparatus 60, the push-pressure rod 61 advances forward, its protrusion 62 and the concavity 35 engage, and the rod 33 is advanced forward in the axial direction.

A part near the end of the rod 33 protrudes from the rotary cylinder 30 and extends into the holding apparatus 20 (to be described below). This part near the end of the rod 33 has a threading 37 that screw-engages with a spring stopper cylinder 36.

There is a cylinder 21 that comprises the holding apparatus 20 and narrows toward its front end, but the diameter of its end 21a (FIG. 2) is slightly larger than the diameter of the opening D' formed in the center of the disk D. The rear end of the cylinder 21 is provided with a flange 21b that fits against the surface of the front end of the front part 31 of the rotary cylinder 30, and the holding apparatus 20 is tightly affixed to the rotary cylinder 30 via this flange by bolts or other means of coupling. The flange, however, is not mandatory; it may be omitted if, for example, the cylinder 21 is screwed to the rotation cylinder 30.

A through-hole 22 is formed inside the cylinder 21; this through-hole 22 comprises a rear hole 22c, middle hole 22b, and front hole 22a, its diameter gradually becoming smaller from the rear to the middle to the front, except the front hole 22a is made slightly wider at its front opening part 22a' of the end of the through-hole 22 is slightly larger than the front hole 22a (see FIG. 2). Housed inside the through-hole 22 is a front rod 23 that can slide within a chuck 25 that can slide inside the front hole 22a of the through-hole 22. The front rod 23 extends along the central axis of the chuck 25 and is connected to the rod 33 so as to be in collinear relationship therewith. At the tip of the front rod 23 is an inverted truncated cone 24.

The chuck 25 comprises a cylinder that can slide between the front rod 23 and the front opening part 22a' of the front hole 22a, and it has an expansible portion 25a which becomes somewhat narrower toward the front. The expansible portion 25a is normally in contact with the outer perimeter of the front rod 23, but it is split into multiple pieces, preferably four, so that it can be spread radially outwardly (see FIG. 2). At the front end of the expansible portion 25a are, in order from its front end, a first bulge 26 and a second bulge 27. The inner perimeter on the inside of the end of the expansible portion 25a is slanted so that the inverted truncated cone 24 of the front rod 23 can easily enter and spread the expansible portion 25a.

Fixed to the rear end of the chuck 25 is a chuck slip-out prevention annular plate 28 having approximately the same diameter as the middle hole 22b of the through-hole 22; it prevents the chuck 25 from slipping out of the holding apparatus. Behind the slip-out prevention plate 28 a spring stopper 29' is screwed to the rear end of the middle hole 22b of the through-hole 22 in order to accommodate a spring 29 that is arranged so as to wind around the front rod 23. The the spring stopper 29' has a hole in its center through which the front rod 23 passes. At all times the chuck 25 is pressed outwardly by the force of expansion of the spring 29. When the slip-out prevention plate 28 is pressed forward by the spring 29 and comes into with the shoulder between the front hole 22a and middle hole 22b of the through-hole 22, both the first bulge 26 and a part of the second bulge 27 protrude from the end of the cylinder 21 (FIG. 2).

When the expansible portion 25a is not spread, the diameter of the first bulge 26 is less than the diameter of the front opening part 22a' of the through-hole 22 inside the cylinder 21, and greater than the diameter of the front hole 22a of the through-hole 22. This allows the chuck 25 to slide into the through-hole 22 until the first bulge 26 comes into contact with the shoulder formed between the front opening part 22a' and the front hole 22a. The diameter of the first bulge 26 is less than the diameter of the opening D' of the disk D, allowing the disk to advance past the first bulge 26 to the second bulge 27.

Inside the rear hole 22c of the through-hole 22, between the shoulder between the rear hole 22c and the middle hole 22b and the aforementioned spring stopper 36 that screw-engages to the front end part of the rod 33, there is disposed a spring 37' so as to wrap around the front end of the rod 33 to which the rod 23 is connected. The resilience of the spring 37' is adjusted by the spring stopper 36, and the front rod 23 and rod 33 are normally pulled rearward against the resilience of spring 29. In this normal condition, the inverted truncated cone 24 of the front rod 23 is in contact with the inner surface of the end of the expansible portion 25a of the chuck 25, and while the expansible portion 25a is caused to spread, the chuck 25 is pressed rearward against the force of the spring 29 until the first bulge 26 of the chuck 25 hits the front end of the cylinder 21.

The disk holding and rotating mechanism 10 operates as follows. Normally its rod 33, front end, and chuck 25 are retracted inside the disk holding and rotating mechanism 10. In this state, the front end of the cylinder 21 and the first bulge 26 of the spread expansible portion 25a touch each other.

When, against the force of spring 37', the rear end of the rod 33 is pushed forward in the axial direction by a means such as the pneumatic push-pressure apparatus 60 shown in FIG. 3, the front rod 23 is pushed forward along with the rod 33. The chuck 25 likewise advances forward by the elastic force of the spring 29. The forward advance of the chuck 25 stops when the slip-out prevention plate 28 strikes the shoulder between the middle hole 22b and the front hole 22a of the through-hole 22 of the cylinder 21. Thus, a part of the second bulge 27 of the chuck protrudes from the cylinder 21.

When the front rod 23 advances further, a part of the inverted truncated cone 24 of the front rod 25 comes out from the end of the chuck 25, the expansible portion 25a, which expanded along with it, converges and comes into contact with the outside surface of the front rod 23. When this happens, the diameter of the first bulge 26 is less than the diameter of the opening D' of the disk D, allowing the disk D to advance past the first bulge 26 all the way to the second bulge 27.

When the disk D is positioned on the second bulge 27, the push-pressure apparatus 60 stops the push-pressure of the rear end of the rod 33. The rod 33 is then moved rearward due to the resilience of the spring 37', thereby causing the front rod 23 to be retracted, and the inverted truncated cone 24 comes into the expansible portion 25a of the chuck 25, causing the expansible portion 25a to radially expand until the outer surface of the second bulge comes into contact with the inner surface of the opening D' of the disk D. The expansible portion 25a, while supporting the disk D, retracts together with the chuck 25 until the side surface of the disk D comes into contact with the front end of the cylinder 21 of the rotating apparatus 20. When the disk D comes into contact with the front end 21a of the cylinder 21, the disk D is grasped and held between the cylinder 21 and the shoulder between the first bulge 26 and the second bulge 27 of the expansible portion 25a, and the disk holding operation is completed.

FIG. 3 is a side view of a part of the cross-section of a treating apparatus for treating both sides of disks with a tape-type treatment member by using four disk holding apparatus of the present invention; FIG. 5 is a partial front view of the apparatus of FIG. 3. In the treatment apparatus, disk holding and rotating mechanisms 10, preferably four of them, are arranged along the circumference of a rotation drive cylinder 50, one every 90 degrees. It is not necessary that there be four disk holding and rotating mechanisms; their number can be determined as appropriate depending on the number of tape drive apparatus 70 that are used.

In this apparatus, when the holding apparatus 20 holds the disk in place, the disk holding and rotating mechanism is fixed on the rotation drive cylinder 50 so that the disk is positioned or indexed in the position for treating both sides of the disk, that is, between the contact rollers of a pair of tape driving drivers (see FIG. 3). When the disk holding and rotating mechanism is thus fixed in place, the disk is automatically positioned in the treatment position merely by the holding apparatus 20 grasping the disk from both sides and holding it in place.

The rotary drive cylinder 50 is attached rotatably via bearing 52' on a support cylinder 51 fixed to the frame 2 inside the case 1 of the treatment apparatus. Thus the rotary drive cylinder 50 is rotated by rotation drive mechanism 52.

The disks are stored parallel to each other within a cassette 80 (shown by a dotted line) and are transported by a cassette conveyance mechanism 81 (shown by a dotted line). When one of the disk arrives at the prescribed position, a lifting means 82 lifts the disk to the position of whichever of the four disk holding and rotating mechanisms that is in the lowest position, that is, it lifts the disk as far as the position where it is positioned onto or removed from the disk holding and rotating mechanism. The lifted disk D is grasped and held by a chuck 84 that has extended from a disk-moving mechanism 83. The disk-moving mechanism 83 moves the grasped disk to the position of the lowest disk holding and rotating mechanism 10. Thus, the push-pressure rod 61 of the pneumatic push-pressure apparatus 60 fixed to the frame 3 positioned directly behind the disk holding and rotating mechanism 10 extends, and the protrusion 62 pushes the rear end of the rod 33. The mechanism used here for positioning and removing disks is one that is normally used in this field, but it is possible to use other means that can position and remove disks.

As shown in FIG. 2, when the rear end of the rod 33 is pushed forward, the front rod 23 and the chuck 25 protrude from the cylinder 21. The expansible portion 25a then converges, and the diameter of the first bulge 26 becomes smaller than the diameter of the opening D' of the disk D. Thus, the chuck 84 of the disk-moving apparatus mechanism 83 extends, and the grasped disk is moved past the first bulge 26 to the second bulge 27.

Then, as explained concerning the operation of the disk holding and rotating mechanism 10, the push-pressure operation of the push-pressure apparatus is released, the resilience of the spring 37' causes the rod 33 and the front rod 23 to retract rearward, and the disk D becomes grasped and held between the end of the cylinder 21 and the shoulder between the first bulge 26 and the second bulge 27. The disk holding and rotating mechanism 10 that holds the disk rotates 90 degrees at a time by the rotary drive cylinder 50 that rotates by the rotation drive mechanism 52, and moves to the treatment position. The rotation is 90 degrees at a time because there are four disk holding and rotating mechanisms 10; when there are two of them, it becomes a 180-degree rotation.

When the disk holding and rotating mechanism arrives at each treatment position, a roller 64 that is connected via a belt to the motor 63 and a pulley 32 of the disk holding and rotating mechanism 10 come into contact with each other. As the motor 63 is driven, the rotation is transmitted to the pulley 32, then the rotary cylinder 30 rotates, and the cylinder 21 of the holding apparatus fixed to the rotary cylinder 30 rotates. The disk, being grasped and held by the cylinder 21 of the holding apparatus and the first bulge 26 of the chuck, rotates in accordance with the rotation of the rotary cylinder 30.

At each treatment position, tape driving apparatus 70, 70', and 70" are arranged and can move parallel to the surface of the disk. When the rotation of the rotary drive cylinder 50 brings a disk to the treatment position, the tape driving apparatus 70 that was in the position of the dot-dash line shown in FIG. 5 moves parallel to the position of the solid line. The other tape driving apparatus 70' and 70" also move in the same way. But the polishing characteristics of the tape of each tape driving apparatus need not all be the same; they should be determined according to the purpose of the treatment.

FIG. 4 shows the tape driving apparatus 70 used in a working example. This tape driving apparatus 70 is typical, but this is not intended to limit the scope of the invention. The tape is supplied from tape supply reels 71a and 71b, passes over contact rollers 72a and 72b, and is wound onto windup reels 73a and 73b. Roller movement mechanisms 74a and 74b approach the disk from both sides in order to make the tape looped on the contact rollers 72a and 72b to come into contact with both sides of the disk, respectively. Thus, as the tape runs along, the surface of the disk become gets treated.

When the treatment at each treatment position is concluded, the rotation drive mechanism 52 operates, causing the disk holding and rotating mechanism to rotate 90 degrees at a time and causing it to move to the next treatment position. The disk holding and rotating mechanism that grasps and holds a disk for which the final treatment has been completed moves to the lowest position. Then the pneumatic push-pressure apparatus 60 operates, pushing the rear end of the rod 33 and advancing it forward. As the rod 33 advances, the front rod 23 advances together with the chuck 25. As the front rod 23 advances further, the inverted truncated cone 25 of the front rod 23 comes out from the chuck 25 so that the expansible portion 25a of the chuck 25 converges and the diameter of the first bulge 26 becomes smaller than the opening D' of the disk D. Then the disk-moving mechanism 83 performs an operation that is the reverse of the operation of mounting a disk, and the disk is removed from the disk holding and rotating mechanism and is moved to another treatment apparatus (for example, a disk washing apparatus).

The holding mechanism of the present invention that grasps and holds disks can, by itself, accurately determine the position of a disk and securely grasp it when the end of the holding apparatus is in the prescribed position.

The disk holding and rotating mechanism of the present invention can appropriately rotate a disk accurately positioned, or indexed by the built-in holding apparatus.

Thus, an apparatus according to the invention that makes use of a disk holding and rotating mechanism in treating the surface of disks can provide a simpler apparatus as a whole than prior art apparatus, with which disk positioning apparatus, etc. must be used.

While the invention has been described and illustrated in connection with the specification embodiments, it should be noted that the present invention is not limited thereto since the true scope and spirit of the invention is defined solely by the appended claims.

What is claimed is:

1. A holding apparatus for grasping and holding a disk having a central opening with a specified inner diameter, said apparatus comprising:
   a cylinder having a front end, an axis which defines an axial direction and a through-hole in said axial direction, said front end of said cylinder having an outer diameter which is slightly greater than said specified inner diameter of said central opening of said disk;
   a front rod received in said through-hole in said cylinder so as to be able to move back and forth in said axial direction, said front rod having on its front end an inverted truncated cone, the maximum outside diameter of said cone being smaller than said inner diameter of said central opening of said disk; and
   a chuck slidably received inside said through-hole of said cylinder between the inner surface of said through-hole and the outer surface of said front rod, said chuck having on its front end an expansible portion which is split in said axial direction into plural pieces so as to be radially expandable, and has a first bulge at its front end, said chuck being supported by elastic means such that said expansible portion normally protrudes partially from said cylinder;
   wherein when said expansible portion partially protrudes from said cylinder, the disk can be moved past said first bulge and be positioned on said expansible portion,
   and when said front rod is retracted into said cylinder, said inverted truncated cone of said front rod comes inside said expansible portion of said chuck so as to spread said expansible portion until said expansible portion touches the inner perimeter of said central opening of said disk, and said chuck is retracted with said front rod so that said disk is grasped and held between said front end of said cylinder and said first bulge.

2. The holding apparatus claimed in claim 1 further comprising a cylindrical rotary means for supporting said cylinder rotatably therein.

3. The holding apparatus claimed in claim 2 wherein said elastic means comprises a spring, said spring presses the rear end of said chuck to cause said expansible portion to partially protrude from said cylinder so that the disk can be moved past said first bulge and be positioned on said expansible portion.

4. The holding apparatus claimed in claim 1 wherein said chuck also has a second bulge adjacent said first bulge, said second bulge having a smaller outer diameter than said first bulge, said second bulge being capable of having said disk positioned thereon.

5. The holding apparatus claimed in claim 1 wherein said elastic means comprises a spring, said spring presses the rear end of said chuck to cause said expansible portion to partially protrude from said cylinder so that the disk can be moved past said first bulge and be positioned on said expansible portion.

6. A disk holding and rotating mechanism for handling a disk having a central opening with a specified inner diameter, said mechanism comprising a disk holding apparatus and a rotating apparatus:
   said disk holding apparatus having:
      a front cylinder having a front end, a rear end, an axis defining an axial direction and a through-hole in said axial direction, the outside diameter of said front end of said front cylinder being slightly greater than said inner diameter of said central opening of said disk;

a first rod received in said front cylinder so as to be able to move back and forth in said axial direction, said first rod having on its front end an inverted truncated cone, the maximum outside diameter of said cone being smaller than the inner diameter of said central opening of said disk, and a chuck slidably received within said through-hole of said front cylinder between inner surface of said through-hole and outer surface of said first rod, said chuck having on its front end a radially expansible portion which is split in said axial direction into plural pieces, and has a first bulge at its front end, said expansible portion being caused to partially protrude from said cylinder by a first elastic means, said rotating apparatus having;

a stationary member, a rotary cylinder supported by said stationary member rotatably around said axis, the front end of said rotary cylinder being coupled to the rear end of said front cylinder so that their axes are collinear to each other, a second rod received in said rotary cylinder so as to be able to move back and forth in said axial direction, the front end of said second rod being coupled to the rear end of said first rod, wherein if the rear end of said second rod is pushed forward, said expansible portion of said chuck, along with said first rod, can partially protrude from said front cylinder, when said expansible portion partially protrudes from said front cylinder, said disk can be moved past said first bulge and be positioned on said expansible portion, when said first rod is retracted into said front cylinder, said inverted truncated cone of said first rod moves into said expansible portion of said chuck so as to spread said expansible portion until said expansible portion touches the inner perimeter of said central opening of said disk, and said chuck is retracted along with said first rod so that said disk is grasped and held between said front cylinder and said first bulge, and the disk which is grasped and held between the end of said cylinder and said first bulge can be rotated by rotating said rotary cylinder.

7. The disk holding and rotating mechanism as claimed in claim 6 wherein said second rod is pressed rearward by a second elastic means.

8. The disk holding and rotating mechanism as claimed in claim 7 wherein said second elastic means comprises a spring, one end of said spring engages with said front cylinder, and the other end of said spring engages with a spring stopper provided on the front end of said second rod.

9. The disk holding and rotating mechanism as claimed in claim 6 wherein said stationary member is a tubular cylinder coaxial with said rotary cylinder.

10. The disk holding and rotating mechanism as claimed in claim 6 further comprising means for causing said rotary cylinder to rotate around said axis.

* * * * *